(12) United States Patent
Kaminski

(10) Patent No.: US 8,755,803 B2
(45) Date of Patent: Jun. 17, 2014

(54) HANDOVER METHOD AND BASE STATION FOR A RADIO COMMUNICATION NETWORK

(75) Inventor: Stephen Kaminski, Eislingen (DE)

(73) Assignee: Alcatel Lucent, Paris (FR)

( * ) Notice: Subject to any disclaimer, the term of this patent is extended or adjusted under 35 U.S.C. 154(b) by 566 days.

(21) Appl. No.: 11/762,754

(22) Filed: Jun. 13, 2007

(65) Prior Publication Data

US 2007/0298802 A1    Dec. 27, 2007

(30) Foreign Application Priority Data

Jun. 20, 2006 (EP) .................................. 06291040

(51) Int. Cl.
*H04W 36/00* (2009.01)

(52) U.S. Cl.
USPC .......................................... 455/439; 455/436

(58) Field of Classification Search
CPC .................................................... H04W 36/00
USPC ........................................ 455/436–444, 13.4
See application file for complete search history.

(56) References Cited

U.S. PATENT DOCUMENTS

| | | | | |
|---|---|---|---|---|
| 5,175,867 A | * | 12/1992 | Wejke et al. | 455/439 |
| 5,854,981 A | * | 12/1998 | Wallstedt et al. | 455/439 |
| 6,628,642 B1 | * | 9/2003 | Mile'n et al. | 370/350 |
| 6,650,686 B1 | * | 11/2003 | Kondo | 375/130 |
| 2005/0096051 A1 | * | 5/2005 | Lee et al. | 455/438 |
| 2007/0015511 A1 | * | 1/2007 | Kwun et al. | 455/436 |
| 2007/0076670 A1 | * | 4/2007 | Kuchibhotla et al. | 370/336 |

FOREIGN PATENT DOCUMENTS

| | | |
|---|---|---|
| CN | 1282496 A | 1/2001 |
| EP | 1565024 A2 | 8/2005 |
| JP | 06-334597 | 2/1994 |
| JP | 2003-518851 | 6/2003 |
| JP | 2003-289561 | 10/2003 |
| JP | 2005-124215 | 12/2005 |
| JP | 2006-74468 | 3/2006 |
| KR | 1999-0036223 | 5/1999 |
| KR | 2005-0024124 | 3/2005 |
| WO | WO 97/32445 A1 | 9/1997 |
| WO | WO 99/33304 | 7/1999 |
| WO | WO 99/44386 A1 | 9/1999 |
| WO | WO 2005/025247 | 3/2005 |

* cited by examiner

*Primary Examiner* — Huy C Ho
(74) *Attorney, Agent, or Firm* — Fay Sharpe LLP

(57) ABSTRACT

A method for handover of a User Equipment from a source base station to a target base station. The proposed method comprises providing User Equipment specific information from the source base station to at least one candidate base station, evaluating an uplink radio situation during uplink transmission of the User Equipment to the source base station by the at least one candidate base station, sending information related to the evaluation to the source base station by the at least one candidate base station, and performing a handover decision by the source base station based on the evaluation.

9 Claims, 2 Drawing Sheets

HANDOVER METHOD AND BASE STATION FOR A RADIO COMMUNICATION NETWORK

BACKGROUND OF THE INVENTION

The invention is based on a priority application EP 06 291 040.1 which is hereby incorporated by reference.

The present invention relates to a method for handover of a User Equipment from a source base station to a target base station.

The present invention also relates to a base station for use as a source base station and as a candidate or target base station in a radio communication network comprising a number of User Equipments.

In mobile radio telecommunication systems, in particular systems comprising OFDM (Orthogonal Frequency Division Multiplex) interfaces, such as Long Term Evolution (LTE) of UMTS (Universal Mobile Telecommunications System), a plurality of radio cells is attached to and served by respective base stations. If a mobile end terminal or User Equipment is moving on the periphery of a given radio cell and is about to enter an adjacent radio cell, attachment of said User Equipment can be transferred from a currently serving base station (also referred to as source base station or source eNodeB) to a target base station or target eNodeB. The corresponding procedure is commonly referred to as handover and is well-known to a person skilled in the art.

In order to perform a successful and beneficial handover, at least some of the following basic information should be evaluated before execution of the handover:
- interference caused by the User Equipment in a candidate base station,
- quality of the uplink radio channel between User Equipment and handover candidate base station,
- potential benefit if the User Equipment performs the handover into the radio cell associated with the candidate base station,
- timing advance for the User Equipment in case the candidate base station is elected as target base station.

However, in currently known radio communication systems, e. g. the above-mentioned OFDM-based LTE system, there is no possibility to evaluate the basic information listed above since the latter is only locally available.

OBJECT OF THE INVENTION

It is the object of the present invention to provide a method of the above-defined type which enables evaluating said basic information thus improving the efficiency of handovers in radio communication systems. It is also an object of the present invention to provide a base station which can be used in a radio communication network in order to translate said method into practice.

SUMMARY OF THE INVENTION

According to a first aspect of the present invention, the object is achieved by providing a method of the above-defined type which comprises the steps of:
- providing User Equipment specific information from the source base station to at least one candidate base station,
- evaluating an uplink radio situation during uplink transmission of the User Equipment to the source base station by the at least one candidate base station,
- sending information related to said evaluation to the source base station by the at least one candidate base station, and
- performing a handover decision by the source base station based on said evaluation.

According to a second aspect of the present invention, the object is also achieved by providing a base station of the above-defined type which comprises:
- means for providing information specific to a User Equipment within a radio cell associated with a source base station to at least one candidate base station,
- means for receiving from the at least one candidate base station information related to an evaluation of a radio uplink situation during uplink transmission of the User Equipment to the source base station,
- means for performing a handover decision with respect to said User Equipment based on said evaluation.

In this way, the present invention is based on the idea that base stations or eNodeBs exchange information which is normally only available locally in a respective base station. A base station provided with this information can explicitly "listen" to uplink transmissions of given User Equipments and can evaluate radio conditions with respect to an identified User Equipment. The evaluated information is of high interest for a current source base station in connection with a future handover decision.

In order to enable thorough evaluation of said radio conditions, in a further embodiment of the method in accordance with the present invention said User Equipment specific information comprises at least one of:
- an identifier of the source base station,
- a User Equipment identifier in the source base station,
- uplink scheduling information of the User Equipment,
- an absolute time measure,
- an assigned uplink power of the User Equipment,
- information about pilot symbols sent by the User Equipment.

For reason of compatibility with existing standardised solutions, in yet another embodiment of the method in accordance with the present invention sending said User Equipment specific information to the at least one candidate base station involves using the same message element structure as for communication with the User Equipment.

For better detection of the uplink signal transmitted by the handover candidate User Equipment, in another embodiment of the method in accordance with the present invention, upon reception of said User Equipment specific information only resources other than those currently assigned to said User Equipment are assigned within a radio cell associated with the at least one candidate base station.

Preferably, quality indicators for the used radio resources should be provided over the complete frequency bandwidth used by the radio communication system. In this context and in accordance with another embodiment of the method in accordance with the present invention, during said step of evaluating the uplink radio situation the source base station assigns resources to said User Equipment in a frequency-diverse manner.

In order to enable beneficial handover decisions by the source base station, in yet another embodiment of the method in accordance with the present invention the evaluation-related information sent back to the source base station comprises at least one of:
- a new User Equipment identifier in the candidate base station if the User Equipment is to be handed over to the candidate base station,
- a timing advance in the candidate base station, an uplink path loss, an uplink power information in the candidate base station.

A timing advance of a candidate base station with respect to the source base station can be determined from timing information comprised in said User Equipment specific information.

To enable an expedited handover to the candidate base station which is selected as target base station, in accordance with a further embodiment of the inventive method the latter comprises forwarding a timing advance measure to the User Equipment.

In order to enable use of the inventive base station in accordance with said second aspect of the present invention as a candidate base station in a radio communication network, in accordance with a further embodiment of the present invention said base station also comprises:

means for receiving said User Equipment specific information from a source base station, means for performing said evaluation, means for providing said evaluation-related information to the source base station.

As will be appreciated by a person skilled in the art, the above-described inventive approach supports distributed Radio Resource Management (RRM).

Further advantages and characteristics of the present invention can be gathered from the following description of preferred embodiments given by way of example only with reference to the enclosed drawings. Features mentioned above as well as below can be used in accordance with the present invention either individually or in conjunction. The described embodiments are not to be regarded as an exhaustive enumeration but rather as examples in connection with a basic concept underlying the present invention.

DETAILED DESCRIPTION

Figure 1:
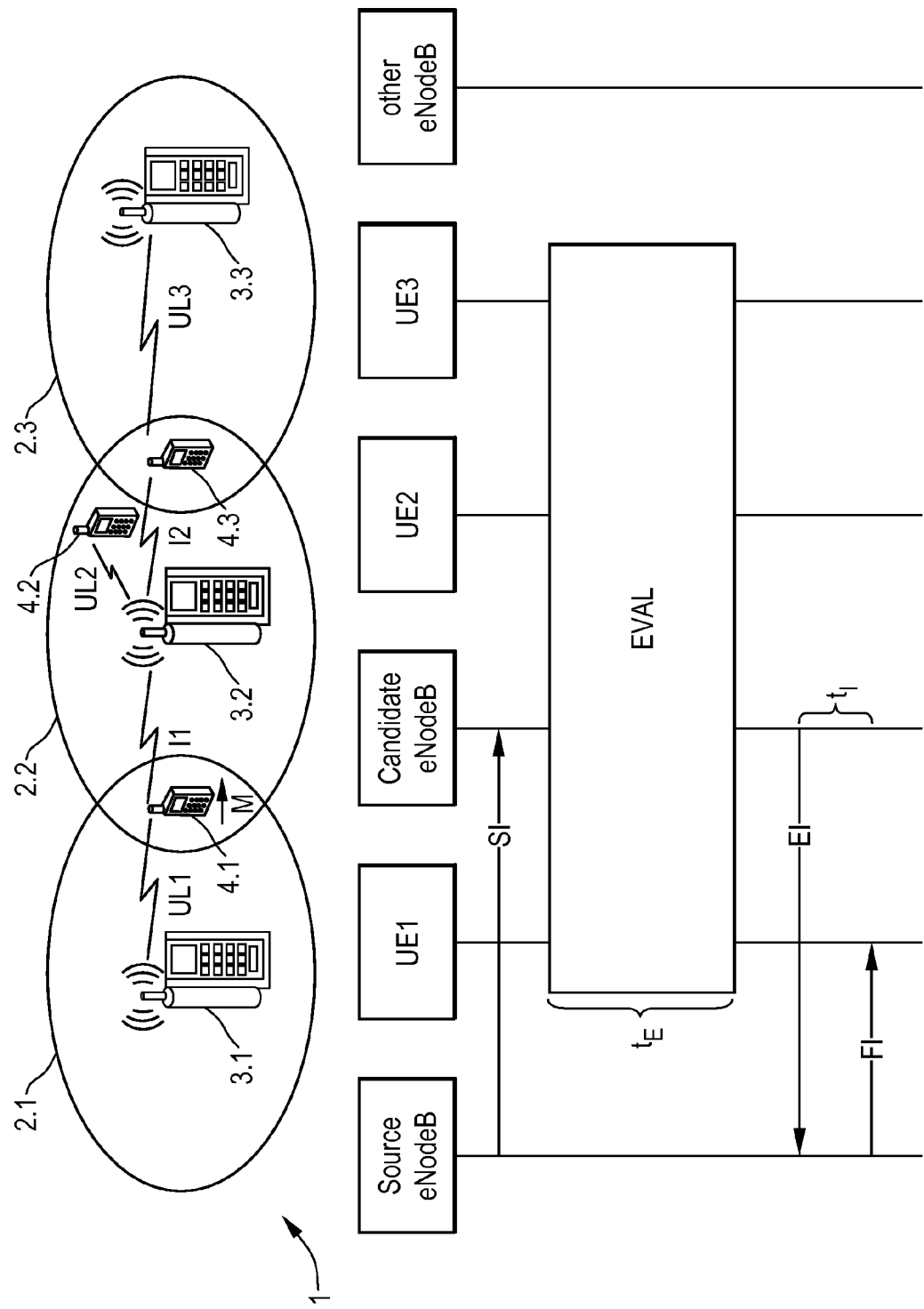
FIG. 1 is a combined system architecture and timing diagram for illustrating an embodiment of the method in accordance with the present invention.

FIG. 1 shows a combined system architecture and timing diagram for illustrating an embodiment of the method in accordance with the present invention. In the upper part of FIG. 1, there is depicted a mobile communication network 1, e. g. an OFDM (Orthogonal Frequency Division Multiplex) based UMTS-LTE system (Long Term Evolution of Universal Mobile Telecommunications System). Said system or network 1 generally comprises a number of radio cells 2.1, 2.2, 2.3 associated with or served by a respective base station 3.1, 3.2, 3.3. In the context of UMTS, said base stations 3.1-3.3 are also referred to as NodeBs or eNodeBs (evolved NodeBs). For mobile telecommunication purposes, the base stations 3.1-3.3 assign respective radio resources, e. g. in terms of used frequencies, transmit power levels, or the like, to mobile end terminals 4.1, 4.2, 4.3 present inside a respective radio cell 2.1-2.3 associated with that particular base station 3.1-3.3. In the exemplary context considered here, said mobile end terminals 4.1-4.3 are also referred to as User Equipment (UE).

Mobility of user equipment 4.1-4.3 is indicated in exemplary fashion in FIG. 1 by means of an arrow M associated with UE 4.1 (hereinafter also referred to as UE1).

As further indicated in the upper part of FIG. 1, UE1 is currently associated with radio cell 2.1/base station 3.1 through uplink UL1. Likewise, UE 4.2 (hereinafter also referred to as UE2) is associated with radio cell 2.2/base station 3.2 through uplink UL2. In the same way, UE 4.3 (UE3) is currently attached to base station 3.3 in radio cell 2.3 through uplink UL3.

As known to a person skilled in the art, if a User Equipment, e. g. UE1, is about to leave the radio cell, e. g. radio cell 2.1, served by a first base station, e. g. base station 3.1, and is about to enter the radio cell, e. g. radio cell 2.2, served by a second base station, e. g. base station 3.2, as indicated by means of arrow M in FIG. 1, a handover is performed. In this context, said second base station is referred to as target base station for that particular UE. Correspondingly, said first base station is referred to as source base station.

As further indicated in FIG. 1, a given base station, e. g. base station 3.2, experiences interference from transmission of other UEs which are located within a coverage area of an associated radio cell, e. g. radio cell 2.2, without being served by that particular base station. In the present FIG. 1, this is indicated as interference I1 between UE1 and base station 3.2 and as interference I2 between base station 3.2 and UE3.

In accordance with the present invention, information related to said interference I1, I2 is taken into account before deciding on a potential handover, e. g. handover of UE1 from radio cell 2.1/base station 3.1 to radio cell 2.2/base station 3.2.

Preferably, the following basic information is evaluated before execution of a handover: Interference caused by the UE in question, e. g. UE1, in a candidate base station, e. g. base station 3.2; quality of the uplink radio channel between said UE and the candidate base station; potential benefit if said UE performs handover into the radio cell, e. g. radio cell 2.2, associated with the candidate base station; and a timing advance for said UE in case the candidate base station is elected target base station for said handover.

As stated above, a basic idea underlying the present invention is that base stations 3.1-3.3 exchange information in connection with, for instance, UE identification, UE scheduling, and radio parameters, which are typically only locally available, i. e. in each individual base station 3.1-3.3. Base stations provided with this type of information can "listen" to uplink transmissions, e. g. UL1, UL2, and can evaluate interference caused by a corresponding UE, i. e. UE1 and UE3, respectively. For instance, knowing the identity of UE1, base station 3.2 can listen to uplink transmission UL1 between UE1 and base station 3.1, thus gathering information with respect to said interference I1.

Furthermore, a timing advance and other transmission characteristics can be evaluated by the potential candidate base stations. The evaluated information is sent back to the current source base station, i. e. base station 3.1 in the present example, and is of high interest for choosing a handover target base station.

This approach is illustrated in the lower part of FIG. 1. In the lower part of FIG. 1, a plurality of vertical lines are labelled "source eNodeB", "UE1", "candidate eNodeB", "UE2", "UE3", and "other eNodeB", respectively. In this context, "source eNodeB" can be identified with said base station 3.1, "candidate eNodeB" can be identified with said base station 3.2, and "other eNodeB" can be identified with said base station 3.3. Furthermore, in the lower part of FIG. 1 messages sent between base stations or between a base station and a User Equipment are depicted by means of horizontal arrows linking the corresponding vertical lines, as described above.

With reference to the embodiment of FIG. 1, the present invention is based on a three stage approach:
1. The source eNodeB/base station 3.1 provides information specific to attached UE1 to at least one candidate eNodeB, i. e. base station 3.2. This is depicted by means of horizontal arrow SI in the lower part of FIG. 1.
2. The at least one candidate eNodeB/base station 3.2 uses said UE-specific information SI to evaluate the uplink radio situation during normal uplink transmission of the UE in question, i. e. UE1, to its serving eNodeB/base station 3.1. Said evaluation is symbolised in the lower part of FIG. 1 by means of a box labelled EVAL. Since said evaluation EVAL takes into account contributions (interference and/or normal uplink transmission) from other User Equipment UE2, UE3 as well, said box spans said vertical lines of all User Equipments UE1-UE3 which contribute to the radio situation in radio cell 2.2 associated with said candidate eNodeB/base station 3.2.
3. Evaluation information about the uplink radio conditions in a candidate cell are sent back to the currently serving source eNodeB/base station 3.1, which is indicated by means of horizontal arrow EI in the lower part of FIG. 1. Based on said information EI, the source eNodeB/base station 3.1 will then perform a handover decision and partly forward the available information to the User Equipment in question, e. g. User Equipment UE1, which is to be handed over. This last aspect is illustrated by means of horizontal arrow FI in the lower part of FIG. 1.

In accordance with an embodiment of the present invention, whenever the above-defined handover-related information shall be evaluated, the following procedure is performed:

Source eNodeB/base station 3.1 provides at least part of the following information to eligible candidate base stations within message SI:
an identifier of source eNodeB/base station 3.1;
an identifier of UE1 in the source eNodeB/base station 3.1;
uplink scheduling information of UE1;
absolute start time of uplink transmission at UE1;
assigned uplink power of UE1; and
information on pilot symbols sent by UE1.

In the present context, said uplink scheduling information comprises indicating which resources were, are, and will be used in the current serving cell (radio cell associated with said source eNodeB). Said absolute time can, for instance, be derived from a GPS signal, and can be indicated either in the form of an absolute value or as a combination of a timing advance for the UE and a time of reception of UE transmission at the source eNodeB. As will be appreciated by a person skilled in the art, individual eNodeBs do not have to be synchronised in terms of physical layer/subframe synchronisation for that purpose.

Preferably, information provided in message SI is sent in the same form that is typically employed for transmission to a User Equipment, i. e. using the same message/information element structure.

As will be appreciated by a person skilled in the art, not all of the above-mentioned information is required at the candidate eNodeB. However, an increased amount of available information will result in a better evaluation of the radio situation.

Having received the above-defined information SI, the at least one candidate eNodeB, e.g. base station 3.2, is enabled to perform the following actions and evaluations of the uplink radio situation within the above-defined evaluation step EVAL: Candidate eNodeB listens to arrival of pilot symbols sent by the UE using the provided information concerning the nature of said pilot symbols and the sending time of said UE.

Taking into account the provided information in connection with a transmit power of the received pilot symbols, candidate eNodeB is able to evaluate the path loss of the uplink direction.

Using these results, the channel quality for the used resources can be evaluated. Preferably, said channel quality is extrapolated to the complete bandwidth available for radio communication.

For an improved evaluation of the radio channel quality over the complete bandwidth within candidate eNodeB, in an embodiment of the present invention current source eNodeB assigns resources in a frequency-diverse manner during evaluation time $t_E$ (cf. FIG. 1) such that candidate eNodeB acquires interference information over the complete bandwidth of radio resources.

Optionally, for better detection of the radio signal transmitted by UE1, resources currently assigned to UE1 within the radio cell associated with source eNodeB (as indicated in said message SI) are not used within the radio cell of candidate eNodeB. If said resources are currently assigned within the radio cell of candidate eNodeB, they will not be reassigned.

Based on the evaluated uplink radio situation, at least part of the following information is sent back to source eNodeB/base station 3.1 within the above-defined message EI:
new identifier of the UE in question in the candidate eNodeB if said evaluation indicates that the UE shall perform its handover to that particular candidate eNodeB;
timing advance in the candidate eNodeB;
uplink path loss;
an uplink power information in the candidate base station; and
a Bid value for a Proffer/Bid-based handover procedure.

Said Proffer/Bid-based handover procedure does not form part of the present application and will be the subject of a further application by the present applicant.

Said uplink path loss can be provided in form of or together with at least one channel quality indicator, as known to a person skilled in the art.

As will further be appreciated by a person skilled in the art, up to this point no resource reservation is performed in the at least one candidate eNodeB.

In a time interval $t_f$ (cf. FIG. 1), i. e. between message EI and message FI, as described above, the elected target NodeB, i. e. base station 3.2 in the present example, is informed and prepared with respect to the upcoming handover. Said information and preparation is not depicted in FIG. 1 since it corresponds to standard methodology which is assumed to be known to a person skilled in the art. After election of the target NodeB as described above, source eNodeB forwards said timing advance measure to the UE within the above-described message FI (UE preparation). This enables expedited handover to the candidate eNodeB/base station 3.2, which has been selected as target eNodeB. Preferably, this forwarding can be done within a handover command message ("HO Command"), as known to a person skilled in the art.

The timing advance, as also known to a person skilled in the art, is used to compensate the radio propagation delay between UE and base station. Typically, the timing of the uplink radio frames has a fixed offset to the downlink radio frames. When the UE is located far from the base station, the propagation delay is high and the timing offset between downlink and uplink transmission is typically designed in such a way that it additionally allows some processing time for generation of the uplink radio transmission within the UE. The timing advance values are set in such a way, that when all the UEs start their individual uplink transmissions, the reception will be in correct and predefined order and within the defined radio frame timing. UEs being far from the base station thus need to send their uplink radio frames in advance with respect to the UEs being close to the base station. For OFDM based mobile communication systems, the accuracy of the timing advance has to be in a range of fractions of the cyclic prefix.

Figure 2:
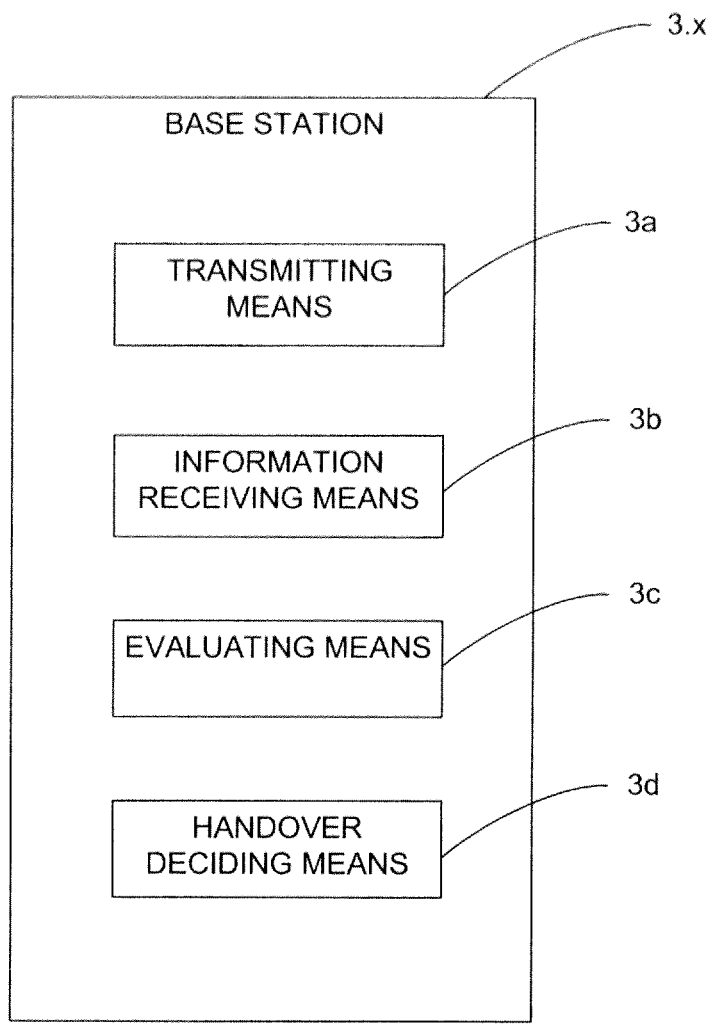
FIG. 2 is a schematic block diagram of a base station in accordance with the present invention

FIG. 2 shows a schematic block diagram of a base station, e. g. base station 3.1 or base station 3.2 of FIG. 1, in accordance with the present invention.

In order to perform the method steps indicated above with reference to appended FIG. 1 the base station of FIG. 2, generally denoted 3.x, comprises information providing or transmitting means 3a, information receiving means 3b, evaluating means 3c, and handover deciding means 3d.

As stated above, providing means 3a are adapted to provide said UE-specific information (message SI of FIG. 1) to at least one candidate base station for potential handover of said UE.

Receiving means 3b are adapted to receive from the at least one candidate base station information related to an evaluation of a radio uplink situation during uplink transmission of the UE to the current source base station, i. e. base station 3.x of FIG. 2. Thus, receiving means 3b are devised for receiving information EI of FIG. 1. Said information is then provided to deciding means 3d which are adapted to perform a handover decision with respect to said UE based on said evaluation information.

In this way, base station 3.x of FIG. 2 effectively functions as source eNodeB in the scenario described above with reference to appended FIG. 1.

Alternatively or additionally, base station 3.x of FIG. 2 is adapted to function as candidate eNodeB in the scenario of FIG. 1. To this end, evaluation means 3c are adapted to perform an evaluation of a radio uplink situation during uplink transmission of a UE to a source base station, said evaluation being based on the above-described UE-specific information received via receiving means 3b. In other words: Receiving means 3b are not only adapted to receive evaluation information from a candidate base station but are also adapted to receive said UE-specific information from a source base station.

Likewise, information providing means 3a of base station 3.x are not only adapted to provide said UE-specific information to a candidate base station but also to provide said evaluation-related information to a source base station.

In this way, base station 3.x of FIG. 2 may be used in the network 1 of FIG. 1 wherein each base station or eNodeB must be able to function as a source eNodeB and as a candidate or target eNodeB, respectively, depending on a current serving situation with respect to a given User Equipment.

The invention claimed is:

1. A method for performing a handover of a User Equipment from a source base station to a target base station, the method comprising:
   receiving User Equipment specific information from the source base station at a candidate base station,
   evaluating an uplink transmission of the User Equipment to the source base station by the candidate base station, and
   sending information related to said evaluation from the candidate base station to the source base station, said evaluation-related information being usable by the source base station to make a handover decision; wherein
   said evaluation-related information comprises at least one of a new User Equipment identifier in the candidate base station if the User Equipment is to be handed over to the candidate base station, a timing advance in the candidate base station, an uplink path loss, and an uplink power information in the candidate base station.

2. The method of claim 1, wherein said User Equipment specific information comprises at least one of an identifier of the source base station, a User Equipment identifier in the source base station, uplink scheduling information of the User Equipment, an absolute time measure, an assigned uplink power of the User Equipment, and information about pilot symbols sent by the User Equipment.

3. The method of claim 1, wherein receiving said User Equipment specific information involves using the same message element structure as for communication with the User Equipment.

4. The method of claim 1, wherein at upon reception of said User Equipment specific information only resources other than those currently assigned to said User Equipment are assigned within a radio cell associated with the candidate base station.

5. The method of claim 1, wherein during said step of evaluating, the source base station assigns resources to said User Equipment in a frequency-diverse manner.

6. The method of claim 1, further comprising determining a timing advance of a candidate base station with respect to the source base station from timing information comprised in said User Equipment specific information.

7. The method of claim 6, further comprising forwarding a timing advance measure to the User Equipment.

8. A base station for use as a source base station in a radio communication network, said base station being operative to:
   provide information specific to a User Equipment within a radio cell associated with the source base station to at least one candidate base station,
   receive from the at least one candidate base station information related to an evaluation of an uplink transmission of the User Equipment to the source base station, wherein the evaluation is performed by the at least one candidate base station, and
   perform a handover decision with respect to said User Equipment based on said evaluation-related information; wherein
   said evaluation-related information comprises at least one of a new User Equipment identifier in the candidate base station if the User Equipment is to be handed over to the candidate base station, a timing advance in the candidate base station, an uplink path loss, and an uplink power information in the candidate base station.

9. A base station for use as a candidate base station in a radio communication network, said candidate base station being operative to:
   receive User Equipment specific information from a source base station,
   perform an evaluation of an uplink transmission of the User Equipment to the source base station, and
   provide information related to the evaluation to the source base station, said evaluation-related information being usable by the source base station to make a handover decision with respect to said User Equipment; wherein
   said evaluation-related information comprises at least one of a new User Equipment identifier in the candidate base station if the User Equipment is to be handed over to the candidate base station, a timing advance in the candidate base station, an uplink path loss, and an uplink power information in the candidate base station.

* * * * *